(12) United States Patent
Nguyen et al.

(10) Patent No.: US 11,409,759 B2
(45) Date of Patent: *Aug. 9, 2022

(54) DATA DUMP FORMATTING UTILIZING DYNAMICALLY CREATED CONTROL STRUCTURES

(71) Applicant: International Business Machines Corporation, Armonk, NY (US)

(72) Inventors: Trinh Huy Nguyen, San Jose, CA (US); Harshpreet Singh, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 350 days.

This patent is subject to a terminal disclaimer.

(21) Appl. No.: 16/250,872

(22) Filed: Jan. 17, 2019

(65) Prior Publication Data

US 2019/0155814 A1     May 23, 2019

Related U.S. Application Data

(63) Continuation of application No. 15/078,968, filed on Mar. 23, 2016, now Pat. No. 10,242,078.

(51) Int. Cl.
| | | |
|---|---|---|
| *G06F 17/30* | (2006.01) | |
| *G06F 16/25* | (2019.01) | |
| *G06F 11/36* | (2006.01) | |
| *G06F 11/07* | (2006.01) | |
| *G06F 16/22* | (2019.01) | |
| *G06F 16/178* | (2019.01) | |
| *G06F 40/205* | (2020.01) | |

(52) U.S. Cl.
CPC ........... *G06F 16/258* (2019.01); *G06F 11/079* (2013.01); *G06F 11/0778* (2013.01); *G06F 11/366* (2013.01); *G06F 16/1794* (2019.01); *G06F 16/2228* (2019.01); *G06F 40/205* (2020.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 5,724,516 A | * | 3/1998 | Temoshenko ....... G06F 11/0709 709/202 |
| 7,394,293 B1 | | 7/2008 | Waldrip et al. |
| 8,286,251 B2 | | 10/2012 | Eker et al. |

(Continued)

OTHER PUBLICATIONS

List of IBM Patents or Patent Applications Treated as Related.
(Continued)

*Primary Examiner* — Hung D Le
(74) *Attorney, Agent, or Firm* — Zilka-Kotab, P.C.

(57) ABSTRACT

In one general embodiment, a computer-implemented method includes identifying a data dump and a predefined data structure, parsing the predefined data structure to determine one or more identifiers within the predefined data structure, determining that a match exists between one or more elements of the data dump and the one or more determined identifiers of the predefined data structure, and formatting the data dump utilizing the predefined data structure, in response to the determining.

20 Claims, 6 Drawing Sheets

(56) References Cited

U.S. PATENT DOCUMENTS

| | | | |
|---|---|---|---|
| 8,621,282 B1* | 12/2013 | Mixter | G06F 11/0706 714/38.11 |
| 8,639,896 B2 | 1/2014 | Bank et al. | |
| 10,242,078 B2 | 3/2019 | Nguyen et al. | |
| 2004/0015728 A1 | 1/2004 | Cole et al. | |
| 2004/0078384 A1 | 4/2004 | Keir et al. | |
| 2004/0213143 A1 | 10/2004 | Linsky et al. | |
| 2005/0120162 A1* | 6/2005 | Sivaram | G06F 11/0778 711/101 |
| 2006/0048117 A1 | 3/2006 | Archambault et al. | |
| 2006/0203920 A1 | 9/2006 | Yongfang et al. | |
| 2007/0011319 A1 | 1/2007 | McClure et al. | |
| 2007/0185673 A1 | 8/2007 | Hubanks et al. | |
| 2008/0272952 A1 | 11/2008 | Wood | |
| 2013/0067285 A1* | 3/2013 | Szegedi | G06F 21/6254 714/45 |
| 2013/0198706 A1 | 8/2013 | Mehta et al. | |
| 2013/0198746 A1* | 8/2013 | Kruglick | G06F 9/45558 718/1 |
| 2014/0074840 A1* | 3/2014 | Wada | G06F 11/36 707/737 |
| 2014/0108876 A1 | 4/2014 | Pathak et al. | |
| 2017/0277760 A1 | 9/2017 | Nguyen et al. | |

OTHER PUBLICATIONS

O'Hare, A. B. et al., "Automated Abstraction of Source Code for Structured Analysis," IBM Technical Disclosure Bulletin, vol. 37, No. 12, Dec. 1994, pp. 167-170.

Subrahmanya et al., "Real Time Application Energy Monitoring Tool," Cognizant Technology Solutions, Feb. 2014, pp. 1-13.

Nguyen et al., U.S. Appl. No. 15/078,968, filed Mar. 23, 2016.

Non-Final Office Action from U.S. Appl. No. 15/078,968, dated Jun. 13, 2018.

Notice of Allowance from U.S. Appl. No. 15/078,968, dated Nov. 6, 2018.

* cited by examiner

DATA DUMP FORMATTING UTILIZING DYNAMICALLY CREATED CONTROL STRUCTURES

BACKGROUND

The present invention relates to debugging, and more specifically, this invention relates to analyzing data dumps during a debugging process.

The analysis of computer data has become increasingly complex as humans try to examine structure of the data because computer data is often presented in hexadecimal format or dump. Identifying and categorizing computer data helps to view such data in a more readable fashion. However, often times there is a large amount of data to analyze to the bits and bytes level. When an attempt is made to manually read the bytes and bits amid a vast hex dump, users must perform a plurality of fixed manual actions, which is prone to error, time consuming, and iterative in that there are many similar control blocks to examine.

SUMMARY

A computer-implemented method according to one embodiment includes identifying a data dump and a predefined data structure, parsing the predefined data structure to determine one or more identifiers within the predefined data structure, determining that a match exists between one or more elements of the data dump and the one or more determined identifiers of the predefined data structure, and formatting the data dump utilizing the predefined data structure, in response to the determining.

According to another embodiment, a computer program product for formatting a data dump includes a computer readable storage medium having program instructions embodied therewith, where the computer readable storage medium is not a transitory signal per se, and where the program instructions are executable by a processor to cause the processor to perform a method. The method includes identifying a data dump and a predefined data structure, parsing the predefined data structure to determine one or more identifiers within the predefined data structure, determining that a match exists between one or more elements of the data dump and the one or more determined identifiers of the predefined data structure, and formatting the data dump utilizing the predefined data structure, in response to the determining.

A system according to another embodiment includes a processor and logic integrated with the processor, executable by the processor, or integrated with and executable by the processor, where the logic is configured to identify a data dump and a predefined data structure, parse the predefined data structure to determine one or more identifiers within the predefined data structure, determine that a match exists between one or more elements of the data dump and the one or more determined identifiers of the predefined data structure, and format the data dump utilizing the predefined data structure, in response to the determination.

Other aspects and embodiments of the present invention will become apparent from the following detailed description, which, when taken in conjunction with the drawings, illustrate by way of example the principles of the invention.

DETAILED DESCRIPTION

Figure 1:
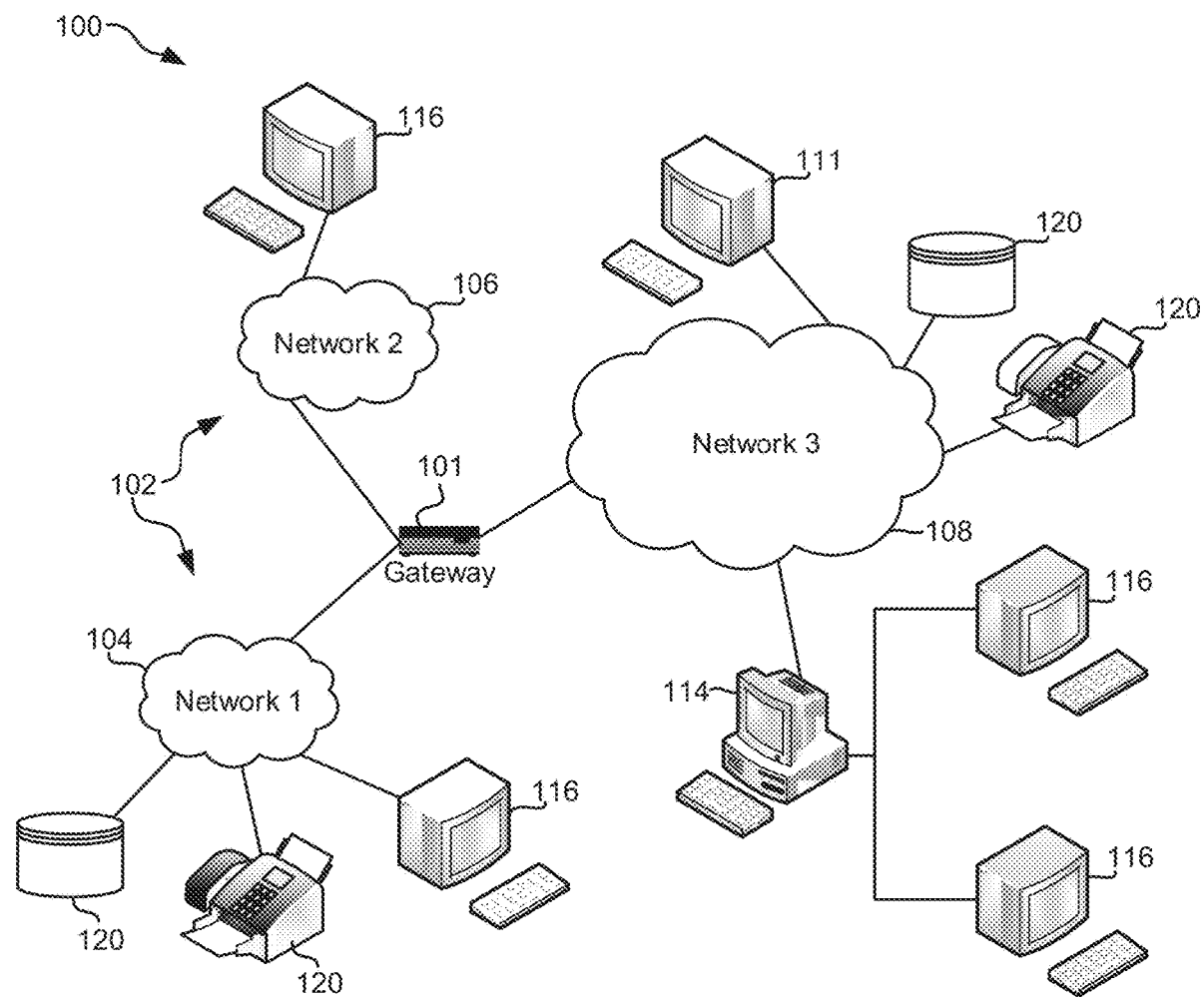
FIG. 1 illustrates a network architecture, in accordance with one embodiment.

The following description discloses several preferred embodiments of systems, methods and computer program products for formatting a data dump. Various embodiments provide a method to reverse computer data into their definitions to the levels of bytes and bits by parsing hex values in a hex dump and mapping them to their original definitions inside a predefined structure.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In one general embodiment, a computer-implemented method comprises identifying a data dump and a predefined data structure, parsing the predefined data structure to determine one or more identifiers within the predefined data structure, determining that a match exists between one or more elements of the data dump and the one or more determined identifiers of the predefined data structure, and formatting the data dump utilizing the predefined data structure, in response to the determining.

In another general embodiment, a computer program product for formatting a data dump comprises a computer readable storage medium having program instructions embodied therewith, where the computer readable storage medium is not a transitory signal per se, and where the program instructions are executable by a processor to cause the processor to perform a method. Additionally, the method comprises identifying a data dump and a predefined data structure, parsing the predefined data structure to determine one or more identifiers within the predefined data structure, determining that a match exists between one or more elements of the data dump and the one or more determined identifiers of the predefined data structure, and formatting the data dump utilizing the predefined data structure, in response to the determining.

In another general embodiment, a system comprises a processor and logic integrated with and/or executable by the processor, where the logic is configured to identify a data dump and a predefined data structure, parse the predefined data structure to determine one or more identifiers within the predefined data structure, determine that a match exists between one or more elements of the data dump and the one or more determined identifiers of the predefined data structure, and format the data dump utilizing the predefined data structure, in response to the determination.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
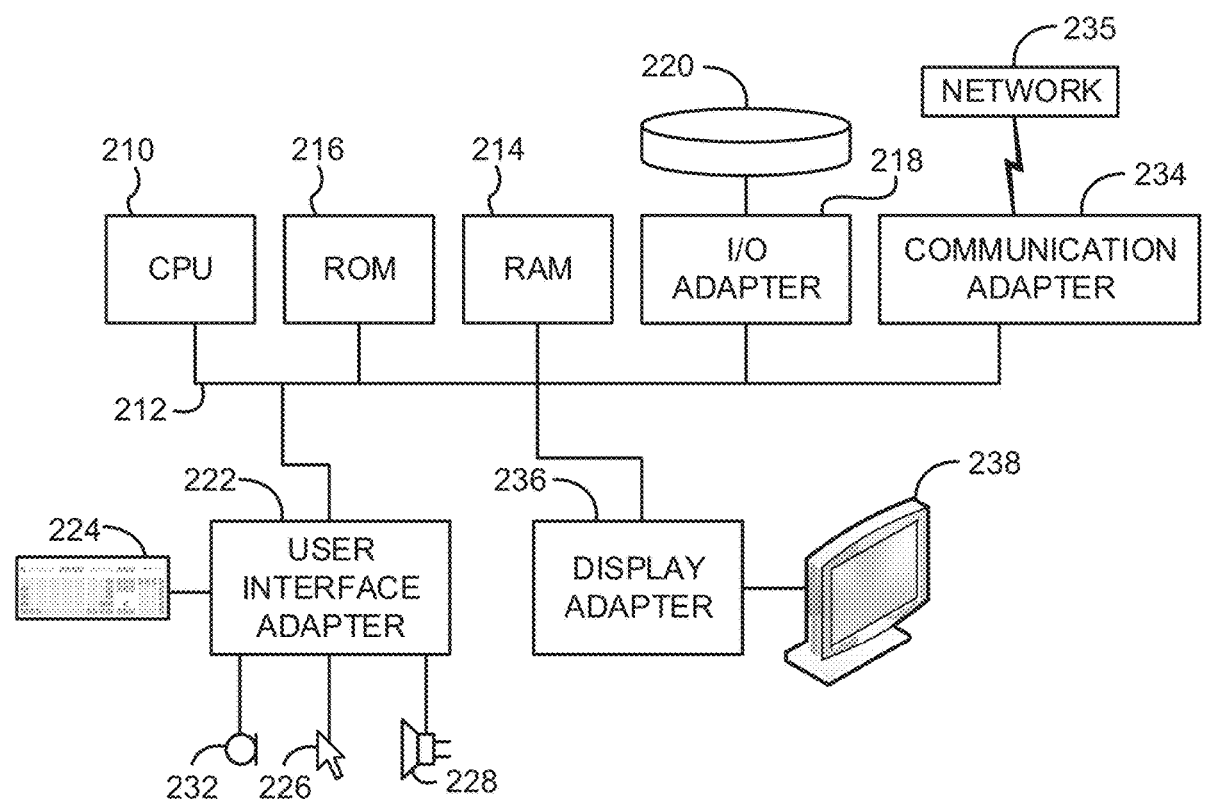
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
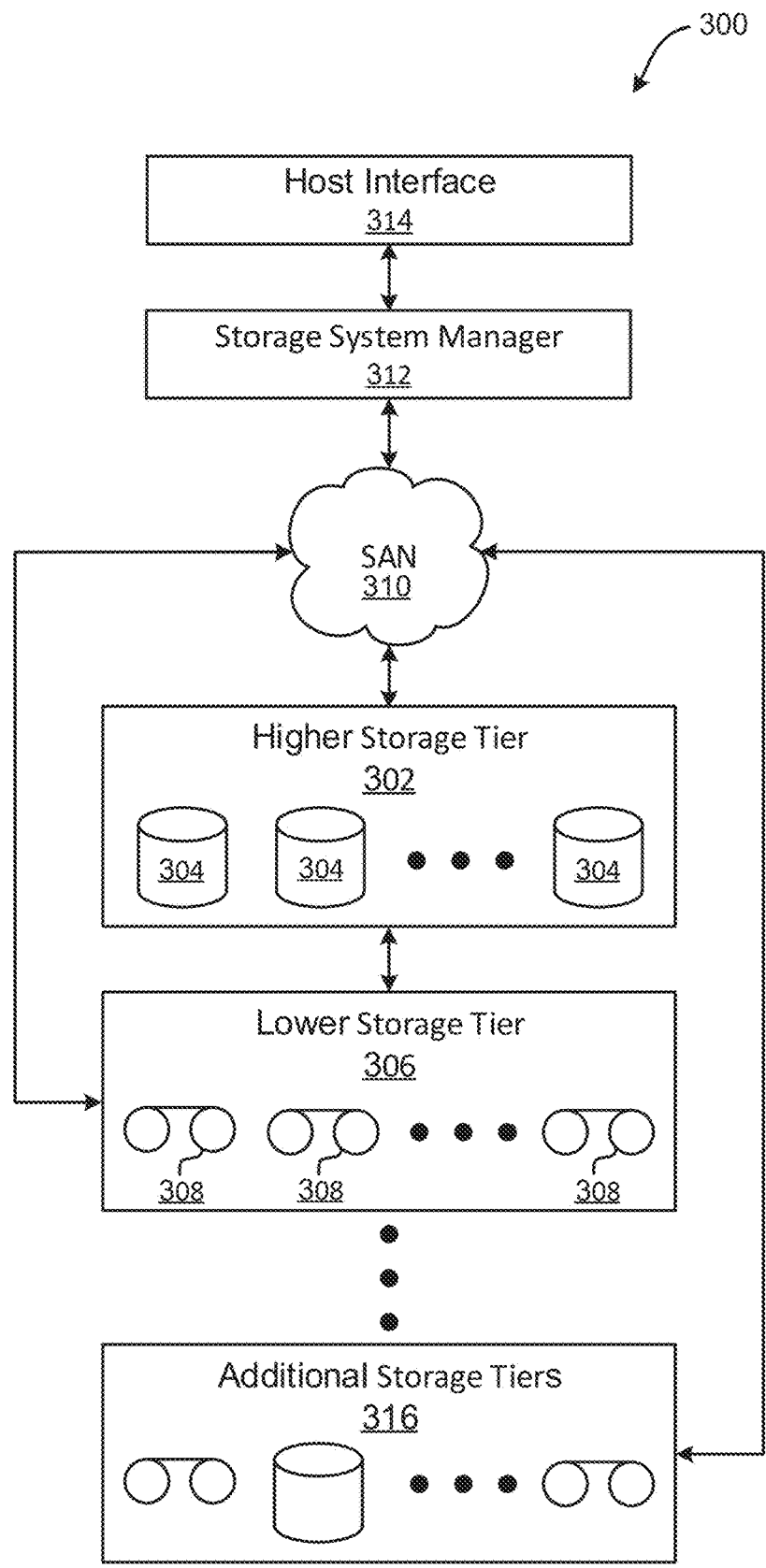
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
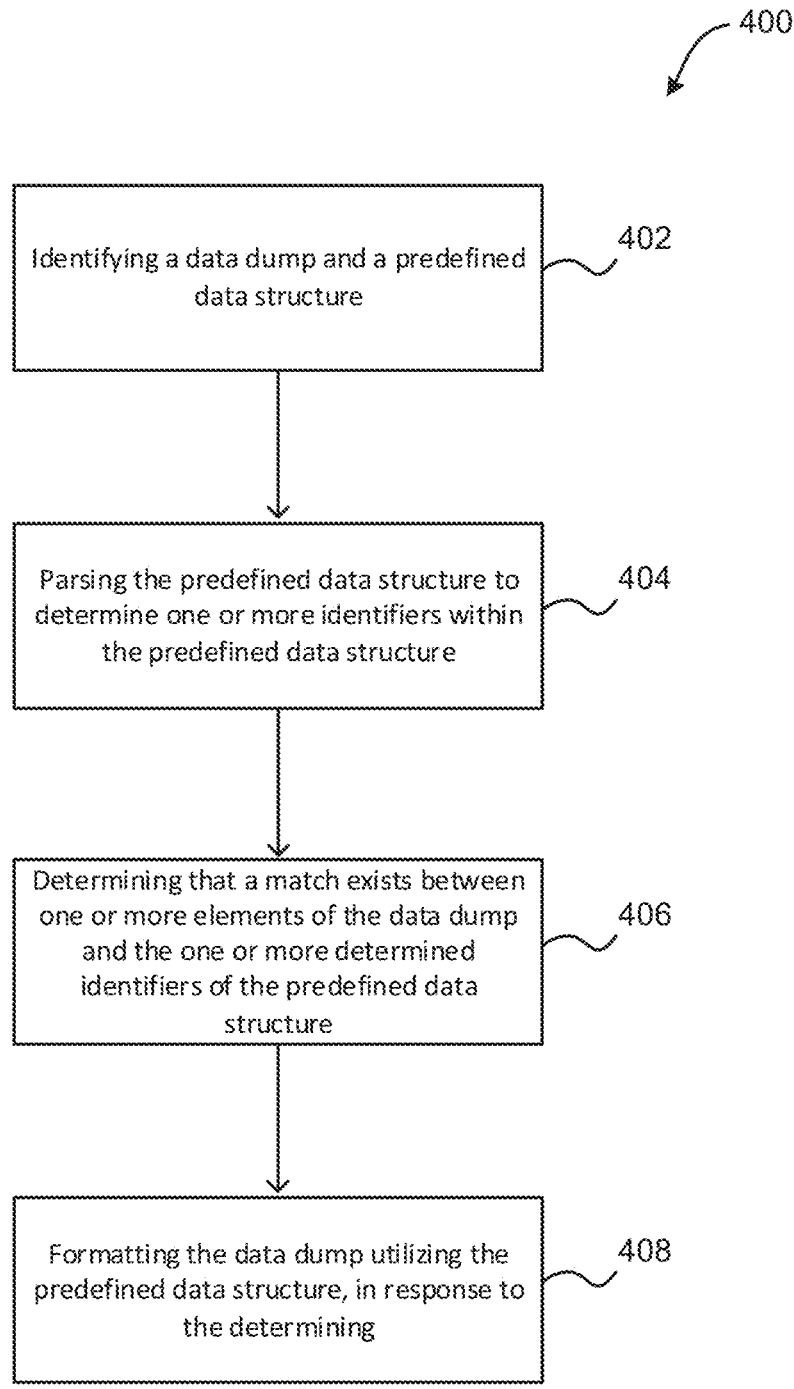
FIG. 4 illustrates a method for formatting a data dump, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a data dump and a predefined data structure are identified. In one embodiment, the data dump may include a view and/or representation of a predetermined quantity of data (e.g., a predetermined quantity of bytes, etc.) stored within a data storage space (e.g., a file, a storage device, a hard disk drive, random access memory (RAM), etc.). In another embodiment, the data dump may be formatted in a predetermined matter. For example, the data dump may include a hexadecimal (hex) dump, where each byte in the hex dump is represented by a two-digit hexadecimal number. In another example, the data dump may be organized into one or more rows. For instance, the data dump may include a hex dump organized into rows of 8 or 16 bytes.

Additionally, in one embodiment, the data dump may include one or more components. For example, the data dump may include a hexadecimal memory address at the beginning of each line of the data dump. In another example, the data dump may include a checksum byte at the end of each line of the data dump. In another embodiment, the data dump may include one or more variables. For example, the data dump may include one or more eye catchers (e.g., one or more sequences of bytes that have a predetermined probability of randomly appearing in memory that are used to identify the data dump, etc.). In yet another embodiment, the data dump may be created as a result of running one or more programs (e.g., one or more debugging programs, etc.). In still another embodiment, the data dump may be submitted by a user (e.g., using a graphical user interface (GUI), etc.).

Further, in one embodiment, the predefined data structure may include a predefined structure including data having one or more predefined components. For example, the predefined data structure may include a control block having a plurality of components including identifiers such as one or more eye catchers, one or more flags, one or more length indicators (e.g., an indicator of a length of one or more portions of the predefined data structure, etc.), one or more format indicators, etc. In another embodiment, the predefined data structure may be associated with a predetermined programming language. For example, the predefined data structure may be defined (e.g., written, formatted, etc.) in a predetermined programming language such as PL/X, C, etc.

Further still, in one embodiment, identifying the predefined data structure may include retrieving the predefined data structure from a data repository. For example, a plurality of predefined data structures may be stored in a library (e.g., a compiler library, a system library, etc.) containing a plurality of predefined data structures defined in a plurality of different programming languages, and one or more of the predefined data structures may be retrieved from the library for comparison to the data dump. In another embodiment, the predefined data structure may be submitted by a user (e.g., using a graphical user interface (GUI), etc.).

Also, as shown in FIG. 4, method 400 may proceed with operation 404, where the predefined data structure is parsed to determine one or more identifiers within the predefined data structure. In one embodiment, parsing the predefined data structure may include analyzing one or more portions of the predefined data structure. For example, the data within the predefined data structure may be analyzed by a language parser to determine the one or more identifiers within the predefined data structure. In another embodiment, the one or more identifiers may include one or more variables such as an eye catcher, a flag, a length indicator, a format indicator, or any other descriptive data. In yet another embodiment, the one or more identifiers may indicate a programming language that is used to define the predefined data structure.

In addition, as shown in FIG. 4, method 400 may proceed with operation 406, where it is determined that a match exists between one or more elements of the data dump and the one or more determined identifiers of the predefined data structure. In one embodiment, determining that the match exists may include comparing the one or more elements of the data dump to the one or more determined identifiers of the predefined data structure to determine one or more matching data elements. For example, an eye catcher may be identified within the data dump and may be compared to an eye catcher identified within the predefined data structure.

In another example, one or more flags may be identified within the data dump and may be compared to one or more flags identified within the predefined data structure. In yet another example, a length of one or more portions of the data dump may be determined and may be compared to one or more length indicators determined within the predefined data structure. In still another example, a format of one or more portions of the data dump may be determined and may be compared to one or more format indicators determined within the predefined data structure.

Furthermore, as shown in FIG. 4, method 400 may proceed with operation 408, where the data dump is formatted utilizing the predefined data structure, in response to the determining. In one embodiment, the data dump may be formatted utilizing the predefined data structure upon determining that the match exists between one or more elements of the data dump and the one or more determined identifiers of the predefined data structure. In another embodiment, formatting the data dump utilizing the predefined data structure may include assigning one or more identifiers from the predefined data structure to one or more portions of the data dump. In yet another embodiment, formatting the data dump utilizing the predefined data structure may include parsing a first structure of the data dump and changing the first structure to match a second structure of the predefined data structure.

For example, one or more definitions of one or more bytes within the predefined data structure may be used to provide a structure to one or more portions of the data dump, describe one or more portions of the data dump, etc. In another example, one or more portions of the data dump may be mapped to one or more definitions provided within the predefined data structure. In yet another example, formatting the data dump utilizing the predefined data structure may include reversing hexadecimal values in a portion of the data dump that is mapped to a definition provided within the predefined data structure to match the definition provided within the predefined data structure.

Further still, in one embodiment, the data dump may be formatted as part of a debugging process, an analysis process, etc. For example, the formatted data dump may be additionally analyzed to determine one or more errors (e.g., one or more deviations from expected results, etc.) within the data dump. In another embodiment, the formatted data dump may be compared to one or more additional formatted data dumps. For example, the formatted data dump may be compared to one or more additional formatted data dumps to determine differences between the formatted data dump and the one or more additional formatted data dumps as part of the debugging process.

In this way, the process of identifying variables within the predefined data structure may be automated, which may reduce errors and save time during the formatting process. Additionally, predefined data structures defined in a plurality of different programming languages may be automatically supported by a single formatting tool. Further, an interface associated with debugging and formatting data dumps may have an improved interface and customizability.

Figure 5:
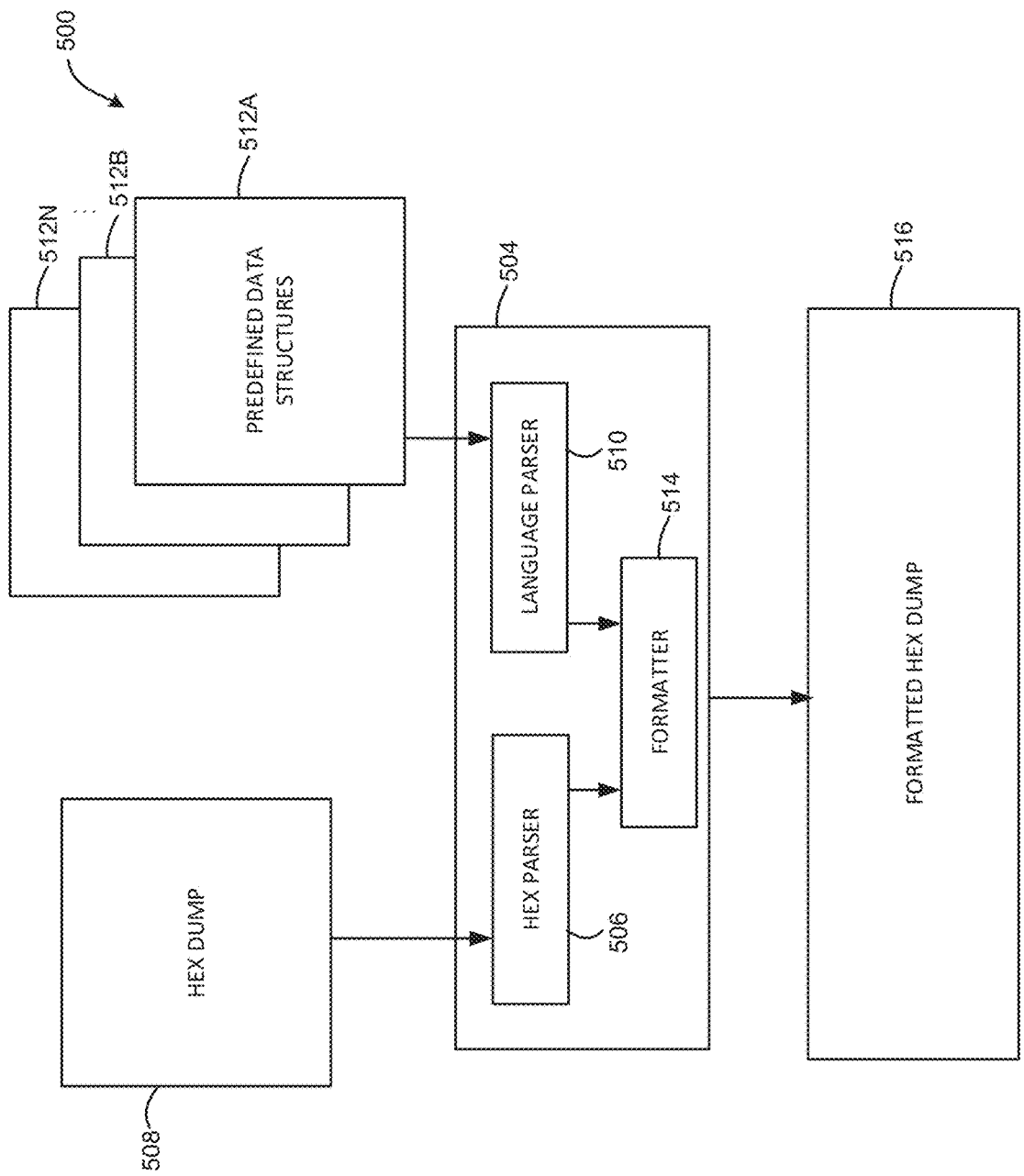
FIG. 5 illustrates an exemplary hex dump formatting environment, in accordance with one embodiment.

FIG. 5 illustrates an exemplary hex dump formatting environment 500, in accordance with one embodiment. As shown in FIG. 5, the exemplary hex dump formatting environment 500 includes a formatting tool 504 having a hexadecimal parser 506 that receives a hex dump 508. In one embodiment, the hex dump 508 may be created as the result of running a predetermined program (e.g., a program to be debugged, etc.). In another embodiment, the hex dump 508 may be retrieved from a predetermined storage location (e.g., a hard drive, RAM, etc.). In yet another embodiment, the hex dump 508 may be retrieved from a remote location (e.g., a remote device, server, etc.). In still another embodiment, the hex dump 508 may be submitted by a user using a GUI.

Additionally, in one embodiment, the hexadecimal parser 506 may parse the hex dump 508. For example, the hexadecimal parser 506 may parse the hex dump 508 in order to identify one or more variables (e.g., one or more eye catchers, one or more lengths, one or more formats, etc.).

Further, the formatting tool 504 includes a language parser 510 that receives a plurality of predefined data structures 512A-N. In one embodiment, the plurality of predefined data structures 512A-N may be retrieved by the language parser 510 from a data repository. In one embodiment, the data repository may not be exclusive to the formatting tool 504. For example, the data repository may store a variety of predefined data structures 512A-N that are created utilizing a plurality of different programming languages and that do not need to be compiled in association with the formatting tool 504.

In another embodiment, one or more of the plurality of predefined data structures 512A-N may be submitted to the language parser 510 by a user using a GUI. In yet another embodiment, one or more of the plurality of predefined data structures 512A-N may be retrieved from a remote location (e.g., a remote device, server, etc.). In still another embodiment, each of the plurality of predefined data structures 512A-N may be defined using the same programming language, or one or more of the plurality of predefined data structures 512A-N may be defined using a programming language different from the other predefined data structures 512A-N.

Further still, in one embodiment, the language parser 510 may parse the plurality of predefined data structures 512A-N. For example, the hexadecimal parser 506 may parse the plurality of predefined data structures 512A-N in order to identify one or more identifiers within each of the plurality of predefined data structures 512A-N.

Also, in one embodiment, the formatting tool 504 may compare the results of the parsed hex dump 508 to the results of each of the parsed plurality of predefined data structures 512A-N to determine a match between one of the plurality of predefined data structures 512A-N and the hex dump 508. For example, the one or more variables identified within the hex dump 508 by the hexadecimal parser 506 may be compared to one or more identifiers identified within each of the plurality of predefined data structures 512A-N by the language parser 510. In another example, a match between one of the plurality of predefined data structures 512A-N and the hex dump 508 may be determined by the formatting tool 504 when one or more identifiers associated with one of the plurality of predefined data structures 512A-N match the one or more variables identified within the hex dump 508.

Furthermore, the formatting tool 504 includes a formatter 514 that creates a formatted hex dump 516. In one embodiment, in one embodiment, upon determining a match between one of the plurality of predefined data structures 512A-N and the hex dump 508, the formatter 514 may format the hex dump 508 according to the matching one of the plurality of predefined data structures 512A-N. For example, the formatter 514 may format one or more hexadecimal values within the hex dump 508 according to one or more identifiers identified within the matching one of the plurality of predefined data structures 512A-N, to create the formatted hex dump 516.

In another example, the formatter 514 may map one or more hexadecimal values within the hex dump 508 to one or more identifiers identified within the matching one of the plurality of predefined data structures 512A-N, to create the formatted hex dump 516. In yet another example, the formatter 514 may parse the hex dump 508 utilizing a programing language used to create the matching one of the plurality of predefined data structures 512A-N, to create the formatted hex dump 516. For instance, the programming language may be used to determine one or more offsets for one or more variables during parsing.

Further still, in one embodiment, the formatted hex dump 516 may be output by the formatter 514 of the formatting tool 504. For example, the formatted hex dump 516 may be displayed to a user via a GUI. In another example, the formatted hex dump 516 may be analyzed (e.g., compared to additional formatted hex dumps in order to determine any discrepancies between the two, etc.). In this way, the formatting tool 504 may reverse computer data within the hex dump 508 into definitions provided by one or more of the plurality of predefined data structures 512A-N to the levels of bytes and bits.

Figure 6:
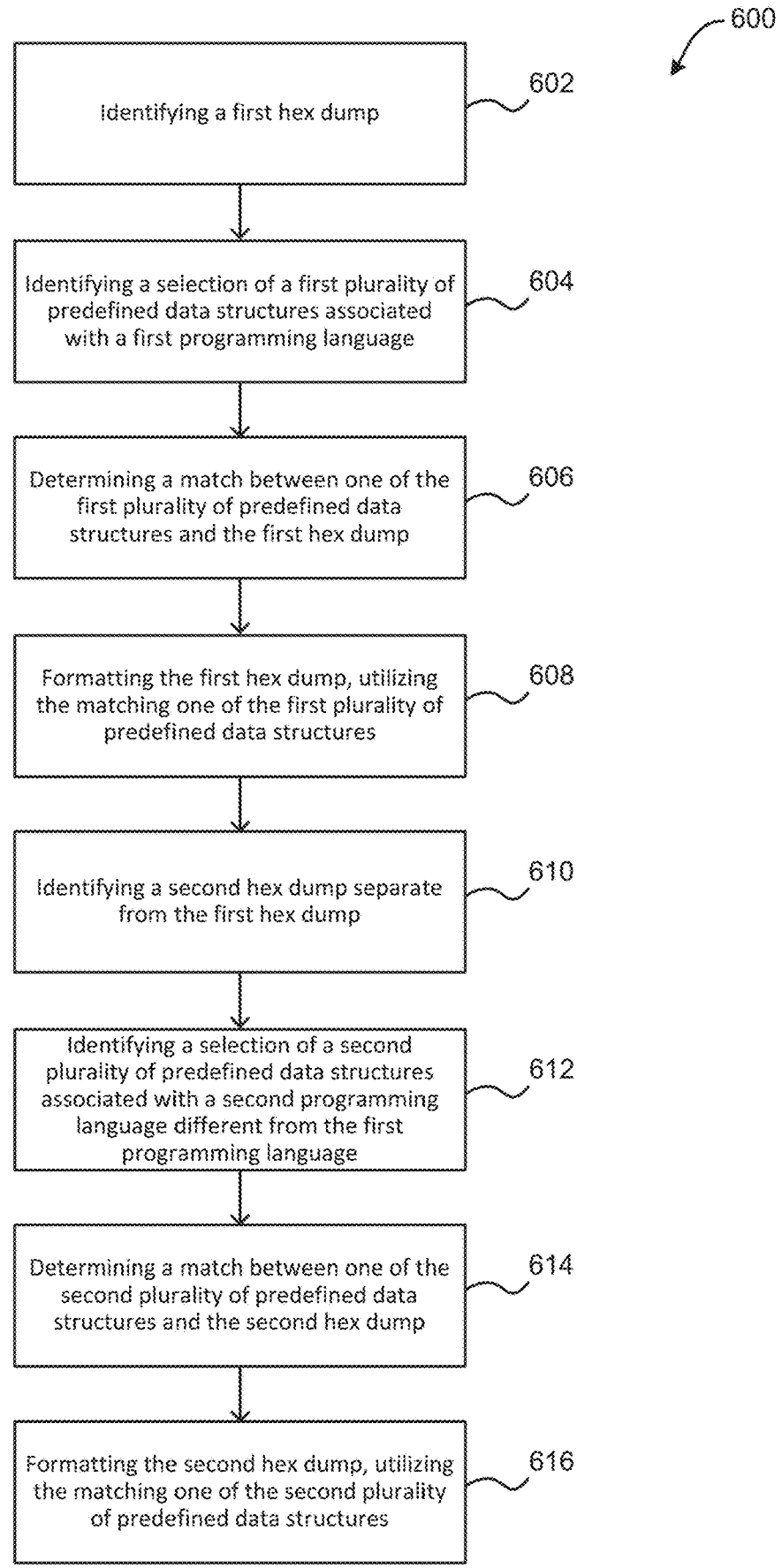
FIG. 6 illustrates a method for formatting a plurality of hex dumps, in accordance with one embodiment.

Now referring to FIG. 6, a flowchart of a method 600 for formatting a plurality of hex dumps is shown according to one embodiment. The method 600 may be performed in accordance with the present invention in any of the environments depicted in FIGS. 1-3 and 5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a first hex dump is identified. Additionally, method 600 may proceed with operation 604, where a selection of a first plurality of predefined data structures associated with a first programming language is identified. Further, method 600 may proceed with operation 606, where a match is determined between one of the first plurality of predefined data structures and the first hex dump. Further still, method 600 may proceed with operation 608, where the first hex dump is formatted, utilizing the matching one of the first plurality of predefined data structures.

Additionally, method 600 may proceed with operation 610, where a second hex dump separate from the first hex dump is identified. Further, method 600 may proceed with operation 612, where a selection of a second plurality of predefined data structures associated with a second programming language different from the first programming language is identified. Further still, method 600 may proceed with operation 614, where a match is determined between one of the second plurality of predefined data structures and the second hex dump. Also, method 600 may proceed with operation 616, where the second hex dump is formatted, utilizing the matching one of the second plurality of predefined data structures.

Furthermore, in one embodiment, a single formatting tool may perform the formatting of both the first hex dump and the second hex dump. In another embodiment, the selection of the second plurality of predefined data structures may be performed by the single formatting tool, after the selection of the first plurality of predefined data structures, without recompiling the single formatting tool. In this way predefined or hard coded control blocks may be avoided, and a user may be provided with the flexibility of adding new control blocks dynamically without having to recompile when adding new control blocks or structures defined in any computer language.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
identifying a data dump and a predefined data structure;
parsing the predefined data structure to determine one or more identifiers within the predefined data structure;
determining that a match exists between one or more elements of the data dump and the one or more determined identifiers of the predefined data structure; and
formatting the data dump in response to the determining, including:
assigning one or more identifiers from the predefined data structure to one or more portions of the data dump,
parsing a first structure of the data dump, and
changing the first structure to match a second structure of the predefined data structure.

2. The computer-implemented method of claim 1, wherein the data dump includes a hexadecimal (hex) dump stored within a data storage space, where each byte in the hex dump is represented by a two-digit hexadecimal number.

3. The computer-implemented method of claim 1, wherein the predefined data structure includes a control block retrieved from a data repository containing a plurality of predefined data structures defined in a plurality of different programming languages.

4. The computer-implemented method of claim 1, wherein the one or more identifiers include a flag, a length indicator, and a format indicator.

5. The computer-implemented method of claim 1, wherein determining that the match exists between one or more elements of the data dump and the one or more determined identifiers of the predefined data structure includes comparing the one or more elements of the data dump to the one or more determined identifiers of the predefined data structure to determine one or more matching data elements.

6. The computer-implemented method of claim 1, wherein the one or more elements of the data dump include:
one or more sequences of bytes that have a predetermined probability of randomly appearing in memory that are used to identify the data dump,
one or more flags,
a length of one or more portions of the data dump, and
a format of one or more portions of the data dump.

7. The computer-implemented method of claim 1, wherein it is determined that that the match exists between the one or more elements of the data dump and the one or more determined identifiers of the predefined data structure in response to:
identifying one or more sequences of bytes within the data dump that have a predetermined probability of randomly appearing in memory that are used to identify the data dump and comparing the identified one or more sequences of bytes to one or more sequences of bytes within the predetermined data structure,
identifying one or more flags within the data dump and comparing the one or more flags within the data dump to one or more flags identified within the predefined data structure,
determining a length of one or more portions of the data dump and comparing the length of the one or more portions of the data dump to one or more length indicators determined within the predefined data structure, and
determining a format of one or more portions of the data dump and comparing the format of the one or more portions of the data dump to one or more format indicators determined within the predefined data structure.

8. The computer-implemented method of claim 1, wherein the formatted data dump is analyzed to determine one or more deviations from expected results within the data dump.

9. The computer-implemented method of claim 1, wherein the one or more identifiers within the predefined data structure indicate a programming language that is used to define the predefined data structure.

10. The computer-implemented method of claim 1, wherein formatting the data dump utilizing the predefined data structure includes reversing hexadecimal values in the data dump to match the definition within the predefined data structure.

11. The computer-implemented method of claim 1, wherein formatting the data dump includes mapping one or more values within the data dump.

12. The computer-implemented method of claim 1, wherein the definition provided within the predefined data structure includes a definition of one or more bytes within the predefined data structure.

13. The computer-implemented method of claim 1, wherein the predefined data structure is analyzed by a language parser to determine the one or more identifiers within the predefined data structure.

14. A computer program product comprising one or more computer readable storage media, and program instructions collectively stored on the one or more computer readable storage media, the program instructions comprising instructions configured to cause one or more processors to perform a method comprising:
identifying, by the one or more processors, a data dump and a predefined data structure;
parsing, by the one or more processors, the predefined data structure to determine one or more identifiers within the predefined data structure;
determining, by the one or more processors, that a match exists between one or more elements of the data dump and the one or more determined identifiers of the predefined data structure; and
formatting, by the one or more processors, the data dump in response to the determining, including:
assigning one or more identifiers from the predefined data structure to one or more portions of the data dump,
parsing a first structure of the data dump, and
changing the first structure to match a second structure of the predefined data structure.

15. The computer program product of claim 14, wherein the data dump includes a hexadecimal (hex) dump stored within a data storage space, the data storage space including a hard disk drive or random access memory (RAM).

16. The computer program product of claim 14, wherein the predefined data structure includes a control block retrieved from a data repository containing a plurality of predefined data structures defined in a plurality of different programming languages.

17. The computer program product of claim 14, wherein the one or more identifiers include a flag, a length indicator, and a format indicator.

18. The computer program product of claim 14, wherein determining that the match exists between one or more elements of the data dump and the one or more determined identifiers of the predefined data structure includes comparing the one or more elements of the data dump to the one or more determined identifiers of the predefined data structure to determine one or more matching data elements.

19. The computer program product of claim 14, wherein the one or more elements of the data dump include:
one or more sequences of bytes that have a predetermined probability of randomly appearing in memory that are used to identify the data dump,
one or more flags,
a length of one or more portions of the data dump, and
a format of one or more portions of the data dump.

20. A computer-implemented method, comprising:
identifying a data dump and a predefined data structure;
parsing the predefined data structure to determine one or more identifiers within the predefined data structure;

determining that a match exists between one or more elements of the data dump and the one or more determined identifiers of the predefined data structure; and formatting the data dump utilizing the predefined data structure, in response to the determining, including reversing hexadecimal values in the data dump to match a definition within the predefined data structure.

* * * * *